United States Patent
Kunisetty et al.

(10) Patent No.: US 10,235,157 B2
(45) Date of Patent: Mar. 19, 2019

(54) METHOD AND SYSTEM FOR ANALYTICS-BASED UPDATING OF NETWORKED DEVICES

(71) Applicant: ARRIS Enterprises LLC, Suwanee, GA (US)

(72) Inventors: Sridhar Kunisetty, Fremont, CA (US); Sanjeev Mishra, Sunnyvale, CA (US); Harindranath P. Nair, Portland, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/394,245

(22) Filed: Dec. 29, 2016

(65) Prior Publication Data

US 2018/0189046 A1 Jul. 5, 2018

(51) Int. Cl.
| | |
|---|---|
| *G06F 9/44* | (2018.01) |
| *G06F 8/65* | (2018.01) |
| *H04L 29/08* | (2006.01) |
| *H04L 29/06* | (2006.01) |
| *G06F 11/22* | (2006.01) |
| *H04L 12/24* | (2006.01) |
| *H04L 12/26* | (2006.01) |

(52) U.S. Cl.
CPC ............ *G06F 8/65* (2013.01); *G06F 11/2289* (2013.01); *H04L 41/082* (2013.01); *H04L 43/0823* (2013.01); *H04L 67/10* (2013.01); *H04L 67/34* (2013.01); *H04L 67/42* (2013.01)

(58) Field of Classification Search
CPC ..... G06F 8/65; G06F 8/61; G06F 8/67; G06F 8/60; H04L 29/08981

USPC ......................................................... 717/172
See application file for complete search history.

(56) References Cited

U.S. PATENT DOCUMENTS

| | | | |
|---|---|---|---|
| 8,341,617 | B2 | 12/2012 | Bunn |
| 8,645,946 | B2 | 2/2014 | Wookey |
| 9,176,728 | B1 | 11/2015 | Dixit et al. |
| 9,262,152 | B1 | 2/2016 | Kurian et al. |
| 9,438,584 | B2 | 9/2016 | Chan et al. |
| 2004/0255286 | A1 | 12/2004 | Rothman et al. |
| 2005/0132351 | A1 | 6/2005 | Randall et al. |
| 2008/0201702 | A1 | 8/2008 | Bunn |
| 2008/0320110 | A1 | 12/2008 | Pathak |

(Continued)

OTHER PUBLICATIONS

PCT International Search Report & Written Opinion, Re: Application No. PCT/US2017/065916, dated Mar. 29, 2018.

*Primary Examiner* — Chuck O Kendall
(74) *Attorney, Agent, or Firm* — Stewart M. Wiener

(57) ABSTRACT

A system (100) includes an update server (110) in communication with one or more client devices (106,107,108) across a network (102). A smart scheduler engine (118) schedules deployment of an update (117) to at least a first group of client devices. A monitoring auto configuration server interface (111) deploys the update to the first group of client devices. An analytics engine (114) identifies one or more anomalies occurring in the first group of client devices resulting from the upgrade. When this occurs, the scheduling engine cancels future updates to at least a second group of client devices where the later group includes devices having one or more device characteristics that correlate with other devices of the first group of client devices experiencing the one or more anomalies.

20 Claims, 6 Drawing Sheets

(56) References Cited

U.S. PATENT DOCUMENTS

| | | |
|---|---|---|
| 2010/0318986 A1 | 12/2010 | Burke et al. |
| 2010/0333082 A1* | 12/2010 | Keys .................... G06F 8/68 |
| | | 717/173 |
| 2012/0124570 A1 | 5/2012 | Alberth, Jr. et al. |
| 2012/0151469 A1 | 6/2012 | Wookey |
| 2014/0123124 A1 | 5/2014 | Gray et al. |
| 2015/0281267 A1 | 10/2015 | Danahy et al. |
| 2015/0324272 A1 | 11/2015 | Seibert, Jr. et al. |

\* cited by examiner

METHOD AND SYSTEM FOR ANALYTICS-BASED UPDATING OF NETWORKED DEVICES

BACKGROUND

Technical Field

This disclosure relates generally to electronic device remediation systems, and more particularly to electronic device remediation systems operable to deliver updates, patches, and/or upgrades to networked electronic devices.

Background Art

In many industries, large numbers of electronic devices are operational in a system. Frequently, each electronic device can communicate across a networked communication infrastructure to obtain software updates, patches, or other upgrades. Where the electronic devices are homogeneous, the updating process is relatively straightforward. However, in many systems, including media content delivery systems, the family of electronic devices receiving media content within a particular ecosystem can be quite diverse.

Illustrating by example, in a media content delivery system that delivers television, movies, and other video and multimedia content, it is now commonplace to allow customers to consume such content not only on traditional televisions, but also on other networked electronic devices such as smartphones, tablet computers, gaming devices, or other electronic devices. This content can be consumed in real time, or alternatively can be consumed "on demand" via streaming services that operate over the Internet. Frequently, media content service providers will provide data services as well, including web browsing, cloud computing and the like. Accordingly, the various devices that operate in a media content delivery services system can be quite diverse, operating many different operating systems and executing a myriad of different software packages, applications, drivers, user settings, and tools.

To ensure that the performance on each device is optimized for a user, system operators will frequently release operating system or application updates. These updates can take various forms, including patches, security updates, service packs, upgrades, and so forth. When releasing an update, a system purveyor's goal is to optimize the system while minimizing problems that may occur on a media-consuming device as a result of the upgrade. It would be advantageous to have an improved method and system for updating networked electronic devices that also minimizes detrimental effects to the devices receiving the upgrade.

Figure 1:
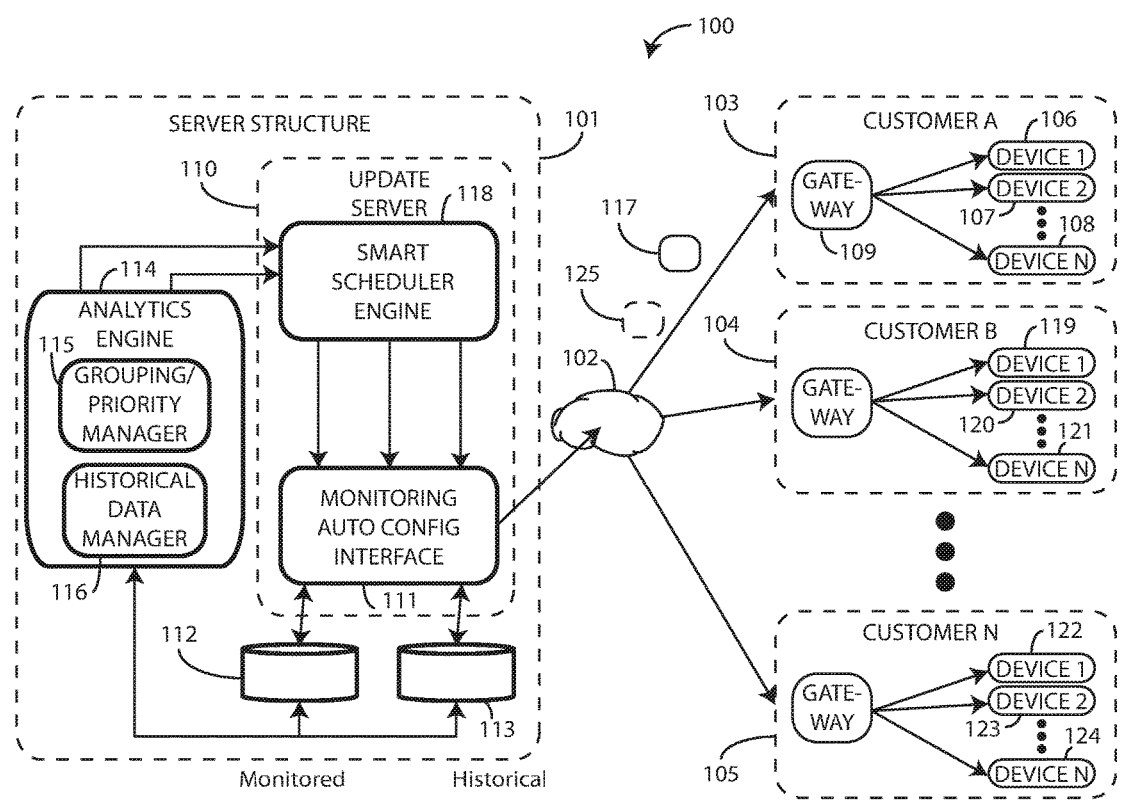
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to delivering updates, upgrades, patches, and other remedial improvements to one or more networked electronic devices. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of analytics-based updates to network electronic devices as described herein. The non-processor circuits may include, but are not limited to, a data receiver, a data transmitter, signal drivers, clock circuits, power source circuits, and user input devices. As such, these functions may be interpreted as steps of a method to perform analytics based updating of networked electronic devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to networks of electronic devices in communication across an infrastructure with a service providing remediation in the form of updates, patches, tools, and the like, improve the functioning of these electronic devices by and improving the overall user experience to overcome problems specifically arising in the realm of electronic device remediation, especially adverse performance issues arising from the update process.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure relate to systems, devices, methods, and components configured to provide updates, patches, tools, and so forth, to electronic devices in communication with a server structure across a network. These electronic devices can include client devices, gateway devices, or other devices. In one or more embodiments, a central node, such as a server structure, is operable to deploy updates, including upgrades, downgrades, and the like, to networked electronic devices. At the same time, embodiments of the disclosure advantageously work to reduce the number of failures due to update delivery, maintain quality of service for the electronic device and quality of experience for the end user. Moreover, embodiments of the disclosure advantageously work to reduce the number of service calls users make to customer care centers in response to updates as well.

As noted above, in a media content delivery system that delivers television, movies, and other video and multimedia content, to ensure that the performance on each device is optimized for a user, system operators will frequently release operating system or application updates to the various devices operating within the system that are operable to receive content. As also noted, the various devices that operate in a media content delivery system can be quite diverse, operating many different operating systems and executing a myriad of different software packages, applications, drivers, user settings, and tools. Such devices can include traditional televisions, desktop computers, laptop computers, smartphones, tablet computers, gaming devices, or other electronic devices. Accordingly, when releasing an update, be it in the form of a patch, upgrade, downgrade, functionality change, security update, service pack, or other form, a system provider may have to deliver the update in many different formats. This need to include so many different formats can make minimizing problems that may occur on a media-consuming device as a result of the upgrade challenging.

For example, while software updates such as upgrades and downgrades can result in functionality changes, improvements in the quality of experience for the end user, improvements in the quality of service, configuration changes, and so forth, such updates can also deleteriously cause adverse issues for the device or its user. For example, while one particular version of a tablet computer's operating system may install and run an upgrade flawlessly, a version once removed may have trouble launching an application after the upgrade has been installed. As many upgrades on modern devices are "pushed" upgrades, i.e., upgrades that occur automatically when released rather than being manually installed, when an incident occurs, the user may be confused as to why a particular application is not working. When a video-on-demand application works one day, then does not work the next, and the user fails to understand that the issue results from an overnight pushed upgrade, this can result in unnecessary and excessive calls to a customer care center.

Advantageously, embodiments of the disclosure function to more intelligently deliver and deploy updates, including upgrades, downgrades, and the like to a diverse ecosystem of devices while, at the same time, reducing the number of failures or adverse effects associated with upgrades. In one or more embodiments, and a smart scheduler engine of an update server schedules one or more upgrades through a monitoring auto configuration server interface of a server structure. In one or more embodiments, the smart scheduler engine is a subcomponent of the update server. However, in other embodiments the smart scheduler engine can be a hardware component operable with the update server. In one or more embodiments, the functionality of the scheduler is fixed within the server structure and does not get modified or controlled from sources exterior to the server structure.

In one or more embodiments, the smart scheduler engine schedules the deployment of updates, including upgrades, downgrades, and the like, based upon a predefined criterion or criteria. Illustrating by example, in one embodiment the smart scheduler engine schedules the deployment of updates based upon one or more criteria such as geographic region, network portion, device type, device model number, operating system version, firmware version, or other criterion.

In one or more embodiments, the smart scheduler engine is operable to schedule multiple types of updates as well. For example, in one embodiment the smart scheduler engine schedules an "active campaign" update in accordance with the Technical Report 069 (TR-069) technical specification. This specification, published by the Broadband Forum and entitled "CPE WAN Management Protocol (CWMP)," defines an application layer protocol by which networked electronic devices may be remotely managed. The specification further governs the remote updating of such devices.

In an active campaign update, the monitoring auto configuration server interface of the update server requests, across a network, electronic devices that are to receive updates to electronically contact the monitoring auto configuration server interface. This request can request the electronic device to receive the update to contact the monitoring auto configuration server interface immediately in one embodiment. In another embodiment, the request can request the electronic device to receive the update to contact the monitoring auto configuration server interface at periodic intervals, e.g., every three hours.

In another embodiment, the smart scheduler engine schedules a Simple Network Management Protocol (SNMP) update in accordance with the SNMP protocol. This protocol is a network management protocol used for configuring networked devices operating on an Internet Protocol (IP) network. In an SNMP update, the monitoring auto configuration server interface electronically communicates with the electronic devices to receive the updates, instructing the same to install the upgrade immediately. In one or more embodiments, the monitoring auto configuration server interface does this by setting a parameter value from a uniform resource locator (URL) where the device to receive the update can download the same.

Regardless of the type of update, once the smart scheduler engine determines that an update is to be scheduled, in one or more embodiments it schedules the update on a rolling basis. Said differently, in one or more embodiments the smart scheduler engine schedules the updating of various devices in subgroups, with a first group receiving the update first, another group receiving the update second, a third group receiving the update next, and so forth.

The groups can be defined based upon one or more criteria such as geographic region, network portion, device type, device model number, operating system version, firmware version, subscriber time zone, combinations thereof, or other criterion. For instance, in one or more embodiments the monitoring auto configuration server interface polls electronic devices to determine information about those devices. This information can include the current version of the device's operating system, applications, tools, and so forth for the purpose of classifying devices having common characteristics into one or more subgroups selected from the group of all electronic devices networked with the monitoring auto configuration server interface. Additionally, the data queried by the monitoring auto configuration server interface can be used to determine optimal times for deploying any upgrades or patches as well. This can work to minimize down time.

In one or more embodiments, the smart scheduler engine prioritizes the groups in a predefined order. In one or more embodiments, this predefined order is a function of historical data occurring when one or more previous groups received the update. This prioritization will be described in more detail below. However, it is well to know that an analysis of historical data can identify which group is the "best" group and, accordingly, should receive an update first. The identification of which group is "best" can be based upon the goal of the purveyor of the upgrade. For example, if a particular type of device is believed to be at risk of failure as a result of performing the upgrade, the smart scheduler engine may prioritize this group as the "best" because analysis of the aftermath can be used to improve the upgrade performance of subsequent groups.

Once the groups are prioritized, in one embodiment the monitoring auto configuration server interface initiates the upgrade with the first group. An analytics engine can then calculate anomalies based upon the operational performance of the devices in the group receiving the update before, and after, the update is installed. The analytics engine can then flag certain anomalies when the amount of those anomalies rises to a predefined threshold. In one or more embodiments, this analysis occurs in real time using a standardized protocol such as the TR-069 protocol or the SNMP. Other standardized protocols with which this analysis can occur will be obvious to those of ordinary skill in the art having the benefit of this disclosure.

In one or more embodiments, when an anomaly is found to exceed a predefined threshold, e.g., a predefined percentage of failures, the smart scheduler engine can take various actions to remediate the upgrade process. Illustrating by example, if the number of failures occurring during the upgrade of a group of devices exceeds a predefined number or percentage, in one or more embodiments the smart scheduler engine can instruct the monitoring auto configuration server interface to execute a rollback that undoes the upgrade. In another embodiment, the smart scheduler can instruct the monitoring auto configuration server interface to perform an auto-cancelation.

Where an auto-cancelation is requested, the monitoring auto configuration server interface proactively searches for groups with characteristics that are similar to the group experiencing the anomalies at an amount exceeding the predefined threshold. For instance, if the first group included tablet computers manufactured by manufacturer A, running operating system N, version X, the monitoring auto configuration server interface may search for similar groups of devices, i.e., those manufactured by manufacturer A, running operating system N, version X, that are yet to be scheduled. In one or more embodiments, the monitoring auto configuration server interface may cancel these groups prior to implementing the upgrade to avoid subsequent anomalies.

In one or more embodiments, the monitoring auto configuration server interface cancels groups yet to be scheduled by the smart scheduler engine for the upgrade in one of various ways. For instance, in one type of upgrade the smart scheduling engine pushes the upgrade to the device receiving the upgrade in advance, but instructs the device to wait to execute the upgrade at a particular time. Where this type of upgrade occurs, the monitoring auto configuration server interface cancels the upgrade by sending a specific cancel upgrade instruction to the device.

In another type of upgrade, the smart scheduling engine specifies that the device receiving the upgrade download that upgrade on a "just in time" basis. Where this type of upgrade occurs, in one embodiment the monitoring auto configuration server interface instructs the smart scheduler engine to cancel all future upgrade requests to groups that match predefined criteria, e.g., for all tablet computers manufactured by manufacturer A, running operating system N, version X.

Embodiments of the disclosure relate to systems, apparatus, methods, and computer products for remediation of networked electronic devices via upgrades, updates, patches, and the like, to ensure optimal performance of those devices. In addition, embodiments of the disclosure can be used to automatically generate reports relating to detected anomalies, scheduled or canceled upgrades, and other information. Additionally, the reports can provide real-time data that allows a system purveyor to assess the currently most vulnerable devices, upgrades, or network segments. Other advantages associated with embodiments of the disclosure will be obvious to those of ordinary skill in the art having the benefit of this disclosure.

Turning now to FIG. 1, illustrated therein is one explanatory system 100 configured in accordance with one or more embodiments of the disclosure. In one or more embodiments, the system 100 comprises a server structure 101 that is in communication across a network 102 with one or more client groups 103,104,105. Illustratively shown in FIG. 1, each client group 103,104,105 can have operational therewith one or more client devices, e.g., client devices 106, 107,108. One or more intermediate network servers, an edge device, or other devices may be communicatively coupled between the server structure 101 and the client groups 103,104,105 in one or more embodiments as well. The illustrative structure of the system 100 of FIG. 1 is explanatory only. Other configurations will readily be obvious to those of ordinary skill in the art having this disclosure.

Examples of client devices 106,107,108 include mobile phones, gateway devices, smartphones, tablet computers, desktop computers, laptop computers, televisions, gaming devices, personal media devices, set-top boxes, or any other device that can receive digital content over the network 102 for playback, storage, and/or processing. Other types of client devices will be obvious to those of ordinary skill in the art having the benefit of this disclosure. The digital content can be data, media, files, and/or any other form of data such as video, audio, images, text, electronic books, games, and/or any other type of data.

A gateway device 109 can be coupled between the server structure 101 and the client devices 106,107,108 in one or more embodiments. The gateway device 109 can be a device disposed at a client group, e.g., client group 103, which facilitates or enables communication between the client devices 106,107,108 and the server structure 101. Illustrating by example, one or more processors of the server structure 101 can associate a particular client device, e.g., client devices 106,107,108, with a particular subscriber of its services, and the gateway device 109 can be disposed at the subscriber's home. Examples of gateway devices 109 can include routers, modems, cable boxes, streaming media servers, set-top boxes, home media servers, data management systems, digital video recorder (DVR), and so forth. Just as the client devices 106,107,108 can receive updates, so too can each gateway device 109.

In one or more embodiments, the server structure 101 includes an update server 110 that is operable with one or more other server structure devices. In this embodiment, the other server structure devices include a monitoring auto configuration server interface 111, an analytics engine 114, a monitored data database 112, and a historical data database 113. In one or more embodiments, the analytics engine 114 comprises a grouping/priority manager 115 and a historical data manager 116. The update server 110 can include a smart scheduler engine 118, and is configured for providing client device remediation in the form of updates in accordance with embodiments of the present disclosure.

In one or more embodiments, the update server 110 is operable to provide updates, patches, tools, and so forth, to electronic devices in communication with a server structure across a network. Illustrating by example the update server 110 can provide an update 117 to one or more of the client devices 106,107,108 in one or more embodiments. The update server 110 can also provide an update 117 to a gateway device 109 as well. While examples described below will focus on delivering the update 117 to the client devices 106,107,108 for ease of explanation, it should be understood that the same techniques could be applied to deliver updates 117 to gateway devices 109 as well. For instance, since the client devices 106,107,108 and gateway devices 109 are operational in the field at client groups 103,104,105, the update server 110 may provision the client devices 106,107,108 and/or gateway device 109 with updates 117 to provide functionality changes, improvements in quality of experience, improvements in quality of service, configuration changes, and so forth post-deployment.

In some embodiments a system purveyor and/or update service provider can facilitate a communication connection between the update server 110 and the various client devices 106,107,108 or gateway devices 109 when the same desires that the client devices 106,107,108 or gateway devices 109 be provisioned with remediation or updates 117 from the update server 110. While in this embodiment the update server 110 is located within the server structure 101, in other embodiments the update server 110 can be located at a facility operated by the manufacturer of the client devices 106,107,108, the manufacturer of the gateway devices 109, a facility of an update service provider, a facility of a network operator, or a facility of another entity.

In one or more embodiments, the update server 110 is a device comprising, but not limited to, one or more processors or processing units, a system memory, and one or more communication bus links coupling various system components including the one or more processors to the system memory. The system bus can take any number of possible bus structures, including a memory bus or memory controller, a peripheral bus, an accelerated graphics port, and a processor or local bus using any of a variety of bus architectures.

The system memory of the update server 110 can be any of a variety of computer readable media. Such media can be any available media that is accessible by the update server 110 and includes both volatile and non-volatile media, removable and non-removable media. The system memory includes computer readable media in the form of volatile memory, such as random access memory (RAM), and/or non-volatile memory, such as read only memory (ROM). The system memory typically contains computer readable instructions and/or program modules such as operating systems and/or application software that are accessible to and/or are presently operated on by the update server 110.

Each of the smart scheduler engine 118, the analytics engine 114, the grouping/priority manager 115, and the historical data manager 116 can each include one or more processors, one or more memory devices, and a communication device that is operable with the one or more processors. The one or more processors can include a microprocessor, a group of processing components, one or more application specific integrated circuits, programmable logic, or other type of processing device. The one or more processors can be operable with the various other components of the smart scheduler engine 118, the analytics engine 114, the grouping/priority manager 115, and the historical data manager 116 as configured in accordance with embodiments of the disclosure. The one or more processors can be configured to process and execute executable software code to perform the various functions of the electronic devices configured in accordance with embodiments of the disclosure. Such code can be stored in memory devices operable with each of the smart scheduler engine 118, the analytics engine 114, the grouping/priority manager 115, and the historical data manager 116. The software code can embody program instructions and methods to operate the various functions of the server structure 101 configured in accordance with embodiments of the disclosure, and also to execute software or firmware applications and modules. The one or more processors can execute this software or firmware to provide device functionality. Each of the smart scheduler engine 118, the analytics engine 114, the grouping/priority manager 115, and the historical data manager 116 may be external to the server structure 101 or may be included within the server structure 101.

Each of the monitored data database 112 and historical data database 113 may include either or both static and dynamic memory components, may be used for storing both embedded code and system data. In one or more embodiments, each of the monitored data database 112 and historical data database 113 the server structure 312 has stored therein data corresponding to characteristics of each client device 106,107,108. Illustrating by example, the monitored data database 112 and historical data database 113 can include information regarding the type of client device, the operating system it is running, the version of operating system, application information, revision information, and other information.

In one or more embodiments, the monitored data database 112 and historical data database 113 each comprise server profile databases that store data specific to the client groups 103,104,105 or client devices 106,107,108 operating system(s), applications running on the client devices 106,107,108, tools running on the client devices 106,107,108, network information, hardware information relating to the client devices 106,107,108, and so forth. The monitored data database 112 and historical data database 113 can comprise data that is used by the update server 110 to schedule deployment of updates 117.

In one or more embodiments, the smart scheduler engine 118 schedules the deployment of updates 117. For brevity, "updates" will be used generally to cover any remotely delivered remediation to a client device 106,107,108, examples including upgrades, downgrades, patches, security updates, service packs, upgrades, and so forth. Still other examples of updates will be obvious to those of ordinary skill in the art.

In one or more embodiments, the smart scheduler engine 118 schedules the deployment of updates 117 based upon a predefined criterion or criteria. In one or more embodiments, this predefined criterion or criteria is a function of data retrieved from one or both of the monitored data database 112 and historical data database 113, after the same is processed by the analytics engine 114.

In one or more embodiments, once the smart scheduler engine 118 determines that an update 117 is to be scheduled, it schedules the update 117 on a rolling basis. Said differently, in one or more embodiments the smart scheduler engine 118 schedules the updating of various client devices 106,108,108 in subgroups. Illustrating by example, the smart scheduler engine 118 may schedule client devices 106,107,108 to receive the update 117 first, followed by client devices 119,120,121, then followed by client devices 122,123,124, and so forth.

Each of these groups or subgroups can be selected based upon a number of criteria, including geographic region, network portion, device type, device model number, operating system version, firmware version, or other criterion. For instance, in one or more embodiments the monitoring auto configuration server interface 111 polls client devices 106,121,123 to determine information about those devices. This information can include the current version of the device's operating system, applications, tools, and so forth for the purpose of classifying client devices 106,121,123 having common characteristics into one or more subgroups selected from the group of all client devices 106,107,108, 119,120,121,122,123,124 networked with the monitoring auto configuration server interface 111. Additionally, the data queried by the monitoring auto configuration server interface 111 can be used to determine optimal times for deploying any upgrades or patches as well. This can work to minimize down time. Using this information, for example, in another embodiment the smart scheduler engine 118 may schedule client devices 106,119,122 to receive the update 117 first, followed by client devices 107,120,123, then followed by client devices 108,121,124 and so forth.

As noted above, in one or more embodiments the smart scheduler engine 118 is operable to schedule multiple types of updates as well. For example, in one embodiment the smart scheduler engine 118 schedules an "active campaign" update in accordance with the TR-069 technical specification. In an active campaign update, the monitoring auto configuration server interface 111 of the update server 110 requests, across the network 102, client devices 106,121,123 that are to receive the update 117 to electronically contact the monitoring auto configuration server interface 111 via electronic communication. This request can request the client devices 106,121,123 to receive the update 117 to contact the monitoring auto configuration server interface 111 immediately in one embodiment. In another embodiment, the request can request the client devices 106,121,123 to receive the update 117 to contact the monitoring auto configuration server interface 111 at periodic intervals, e.g., every three hours.

In another embodiment, the smart scheduler engine schedules a SNMP update in accordance with the SNMP protocol. In an SNMP update, the monitoring auto configuration server interface 111 electronically communicates across the network 102 with the client devices 106,121,123 to receive the update 117, instructing the client devices 106,121,123 to install the update 117 immediately. In one or more embodiments, the monitoring auto configuration server interface 111 does this by setting a parameter value from a URL where the client devices 106,121,123 to receive the update 117 can download the same.

In one or more embodiments, the smart scheduler engine 118 prioritizes the groups in a predefined order. In one or more embodiments, this predefined order is a function of historical data drawn from the historical data database 113, as processed by the analytics engine 114. An analysis of historical data drawn from the historical data database 113 can identify which group is the "best" group and, accordingly, should receive an update first. The identification of which group is "best" can be based upon the goal of the purveyor of the upgrade. For example, if a particular type of device is believed to be at risk of failure as a result of performing the upgrade, the smart scheduler engine may prioritize this group as the "best" because analysis of the aftermath can be used to improve the upgrade performance of subsequent groups.

Once the groups are prioritized, in one embodiment the monitoring auto configuration server interface 111 initiates the update 117 with the first group. For example, the monitoring auto configuration server interface 111 can deliver the update 117 to a particular group of client devices, e.g., client devices 106,121,123. While the update 117 is being installed on these client devices 106,121,123, the monitoring auto configuration server interface 111 can receive statistics relating to the upgrade process and can store them in the monitored data database 112. Examples of such data include whether the update 117 succeeded, failed, or requires a retry. Upgrades can fail for many reasons, including transfer failures, download request failures, campaign lockouts, non-responsive devices, incompatible software versions, failure to apply the update 117 properly, and so forth. Other reasons will be obvious to those of ordinary skill in the art having the benefit of this disclosure. Each of these reasons can be stored in the monitored data database 112.

Once the upgrade process to the first group of client devices 106,121,123 is completed, the analytics engine can examine the data stored in the monitored data database 112 and process it to determine statistical conclusions relating to the upgrade. These statistics can be stored in the historical data database 113. For example, the analytics engine 114 can calculate anomalies based upon the operational performance of the client devices 106,121,124 in the group receiving the update 117 before, and after, the update 117 is installed.

In one or more embodiments, the analytics engine 114 can then flag certain anomalies when the amount of those anomalies rises to a predefined threshold. In one or more embodiments, this analysis occurs in real time using a standardized protocol such as the TR-069 protocol or the SNMP. Other standardized protocols with which this analysis can occur will be obvious to those of ordinary skill in the art having the benefit of this disclosure.

In one or more embodiments, when an anomaly is found to exceed a predefined threshold, e.g., a predefined percentage of failures, the analytics engine 114 can deliver this information to the smart scheduler engine 118. The smart scheduler engine 118 can take various actions to remediate the upgrade process for client devices 107,108,119,120,122, 123 yet to receive the update 117. Illustrating by example, if the number of failures occurring during the upgrade of a group of devices, e.g., client devices 106,121,124, exceeds a predefined number or percentage, such as five percent, in one or more embodiments the smart scheduler engine 118 can instruct the monitoring auto configuration server interface 111 to execute a rollback 125 that undoes the upgrade. In another embodiment, the smart scheduler can instruct the monitoring auto configuration server interface 111 to perform an auto-cancelation.

Where an auto-cancelation is requested, the monitoring auto configuration server interface 111 proactively searches for groups with characteristics that are similar to the group experiencing the anomalies at an amount exceeding the predefined threshold. For instance, if the first group included tablet computers manufactured by manufacturer A, running operating system N, version X, the monitoring auto configuration server interface 111 may search for similar groups of devices, i.e., those manufactured by manufacturer A, running operating system N, version X, that are yet to be scheduled. Thus, if client device 106 is a tablet computer manufactured by manufacturer A, running operating system N, version X, and client device 122 is the same tablet computer manufactured by manufacturer A, running operating system N, version X, in one or more embodiments, the monitoring auto configuration server interface 111 may cancel the devices in any groups yet to be upgraded prior to implementing the update 117 to avoid subsequent anomalies.

In one or more embodiments, the monitoring auto configuration server interface 111 cancels groups yet to be scheduled by the smart scheduler engine 118 for the upgrade in one of various ways. For instance, in one type of upgrade the smart scheduler engine 118 pushes the update 117 to the device receiving the update 117 in advance, but instructs the device to wait to execute the update 117 at a particular time. Where this type of upgrade occurs, the monitoring auto configuration server interface 111 cancels the upgrade by sending a specific cancel upgrade instruction to the device.

In another type of upgrade, the smart scheduler engine 118 specifies that the device receiving the update 117 download that upgrade on a "just in time" basis. Where this type of upgrade occurs, in one embodiment the monitoring auto configuration server interface 111 instructs the smart scheduler engine 118 to cancel all future upgrade requests to groups that match predefined criteria, e.g., for all tablet computers manufactured by manufacturer A, running operating system N, version X.

Within the analytics engine 114, the grouping/priority manager 115 and the historical data manager 116 can perform various tasks. Beginning with the grouping/priority manager 115, in one or more embodiments the grouping/priority manager 115 works to divide the population of client devices 106,107,108,119,120,121,122,123,124 into batches or groups, e.g., with client devices 106,119,122 defining a first group, client devices 107,120,123 defining a second group, client devices 108,121,124 defining a third group, and so forth. This division can be a function of data stored in the historical data database 113 as processed by the analytics engine 114. The smart scheduler engine 118 can use this information to schedule the deployment of the update 117 to groups or batches in such a way so that the monitoring auto configuration server interface 111 can detect failures and store them in the monitored data database 112 early in the upgrade process so as to minimally impact the population of client devices 106,107,108,119,120,121,122, 123,124 during the upgrade.

The grouping/priority manager 115 can use various criteria to divide the population of client devices 106,107,108, 119,120,121,122,123,124 into batches or groups. For example, the grouping/priority manager 115 can prioritize the groups or batches depending on the environment and goals of the system purveyor. Some of these will be shown in more detail with reference to the subsequent figures. Still others will be obvious to those of ordinary skill in the art having the benefit of this disclosure. In one or more embodiments, the grouping/priority manager 115 divides the population of client devices 106,107,108,119,120,121,122,123, 124 into batches or groups as a function of the data stored in the historical data database 113 as processed by the analytics engine 114 as previously described.

Illustrating by example, in one embodiment the grouping/priority manager 115 may analyze the data in the historical data database 113 to determine failure rates for particular device configurations. In one embodiment, the grouping/priority manager 115 may schedule those most likely to fail first so that any remedial steps can be taken early in the process without impacting the ecosystem significantly. In another embodiment, the grouping/priority manager 115 may schedule those devices least likely to fail first. As noted above, the grouping/priority manager 115 may use different types of information in its division, including geographic location of client devices, manufacturer of client devices, model number of client devices, and so forth.

Turning to the historical data manager 116, this component monitors data collected periodically by the monitoring auto configuration server interface 111 that is stored in the historical data database 113. The historical data manager 116 can also monitor data prior to an update 117 so that differences in client device performance occurring before and occurring after the update 117 can be determined. In one or more embodiments, the monitoring auto configuration server interface 111 forces a data sample collection just prior to deploying an upgrade. The monitoring auto configuration server interface 111 collects the data just before the scheduled upgrade instead of at a regular periodic time intervals. This works to ensure that the historical data manager 116 has the latest "before" data that may offer additional insights along with the historical data stored in the historical data database 113.

Working in tandem with the grouping/priority manager 115 and the historical data manager 116, the analytics engine 114 performs anomaly detection, e.g., the detection of failures, after the update process for a particular batch. While failures are one type of anomaly, there are others. For instance, error rates, such as that occurring from a data transmission error and the like, can constitute an anomaly. Similarly, a lack of service registration, e.g., after the upgrade the client device does not reboot, come back online, and/or register its services, can also constitute an anomaly. Other anomalies will be obvious to those of ordinary skill in the art having the benefit of this disclosure.

Based upon information from the analytics engine 114, including anomaly data, the smart scheduler engine 118 can make intelligent scheduling decisions. For example, the smart scheduler engine 118 can decide which group or batch to schedule next. Where anomalies are found the smart scheduler engine 118 can instruct the monitoring auto configuration server interface 111 to rollback the changes for the devices in that batch that encountered the anomaly. The smart scheduler engine 118 can further, where anomalies are found, find similar groups or batches that are yet to be scheduled and can cancel them or instruct the monitoring auto configuration server interface 111 to do so. The smart scheduler engine 118 can also generate reports logging any cancelations, rollbacks, or anomalies as well.

Advantageously, the system 100 intelligently schedules upgrades after considering anomalies occurring in prior upgrades, thereby maintaining better quality of service and quality of experience for the client devices. This advantageously results in a reduction of customer service calls. The system 100 offers improvement over prior art systems in that it uses historical data regarding types of equipment to determine an order and/or priority of batches to be upgraded. Additionally, prior art systems do not use historical data to determine whether software updates caused identified anomalies.

Figure 2:
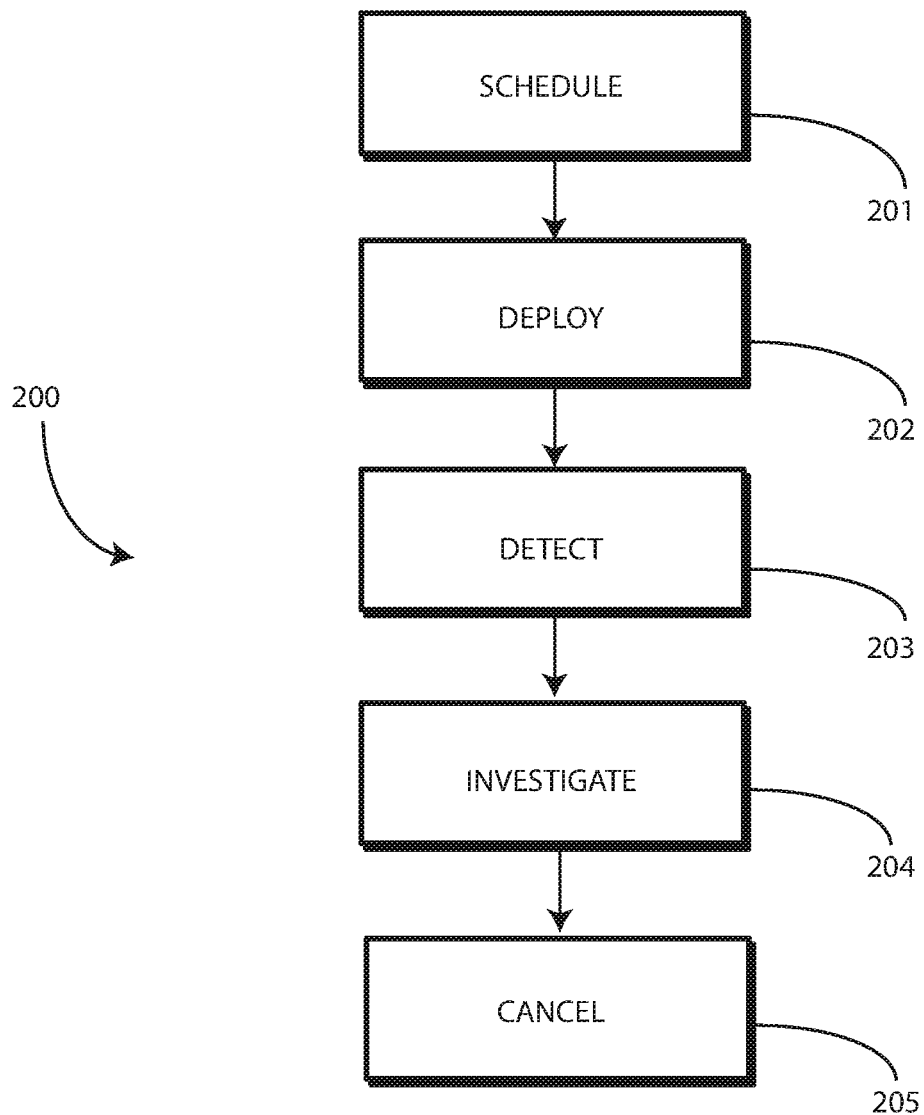
FIG. 2 illustrates one explanatory method in accordance with one or more embodiments of the disclosure.

Turning now to FIG. 2, illustrated therein is one explanatory method 200 for deploying upgrades in accordance with one or more embodiments of the disclosure. The method 200 provides an automated process that uses analytics to mine historical data to schedule an initial group or batch of client devices to which an update will be deployed. Moreover, the method 200, in real time in one or more embodiments, detects anomalies in client devices resulting from the update procedure on one or more groups or batches of client devices. The method 200 then uses this information to predict potential software update failures on client devices yet to be updated. In one or more embodiments, the method 200 can automatically cancel schedule of software update on those identified client devices, thus stopping failures before they occur.

Beginning at step 201, the method 200 schedules rolling updates of client devices by selectively deploying an update to groups or batches of client devices successively. Illustrating by example, in one or more embodiments, step 201 comprises scheduling deployment of an update to a first group or batch of client devices first, followed by deployment of the update to a second group or batch of client devices second, followed by delivering the update to a third group or batch of client devices third, and so forth. In one or more embodiments, step 201 further includes prioritizing the groups or batches based upon an analysis of historical data as previously described. At step 202, the method 200 deploys the update to one or more groups or batches of client devices.

At step 203, once the update is deployed to one or more groups or batches of client devices, the method 200 detects anomalies by comparing historical data with monitored data captured from client devices after the update. For example, step 203 may include detecting that a client device was operational prior to the update, i.e., historical data, and comparing this with the fact that the client device failed to boot after the update, i.e., monitored data. The fact that the client device failed to boot would constitute an anomaly.

At step 204, the method 200 investigates groups or batches of client devices yet to receive the update to determine whether device characteristics exist in the groups or batches of client devices yet to receive the update that correlate with the device characteristics from prior groups or batches experiencing the anomaly. For example, step 204 may comprise investigating groups or batches of client devices yet to receive the update to determine if those groups include tablet computers manufactured by manufacturer A, miming operating system N, version X, where the client devices experiencing the anomaly, as determined by step 203, had the same configuration and so forth.

At step 205, the method 200 proactively cancels all future updates of client devices matching the client devices experiencing the anomaly, as determined by step 203. Continuing the example, while step 204 determined where tablet computers manufactured by manufacturer A, running operating system N, version X existed in groups or batches of client devices yet to receive the update, step 205 proactively cancels future updates of tablet computers manufactured by manufacturer A, running operating system N, version X existing in groups or batches of client devices yet to receive the update until the reasons for the anomaly can be determined and resolved. In addition to proactively canceling future updates, step 205 can also comprise rolling back the update deployed at step 202.

Advantageously, the method 200 results in reducing failures associated with software updates. Additionally, the method 200 reduces customer service calls, improves the quality of experience for the user, and improves the quality of service for the user. Other advantages will be obvious to those of ordinary skill in the art having the benefit of this disclosure.

Figure 3:
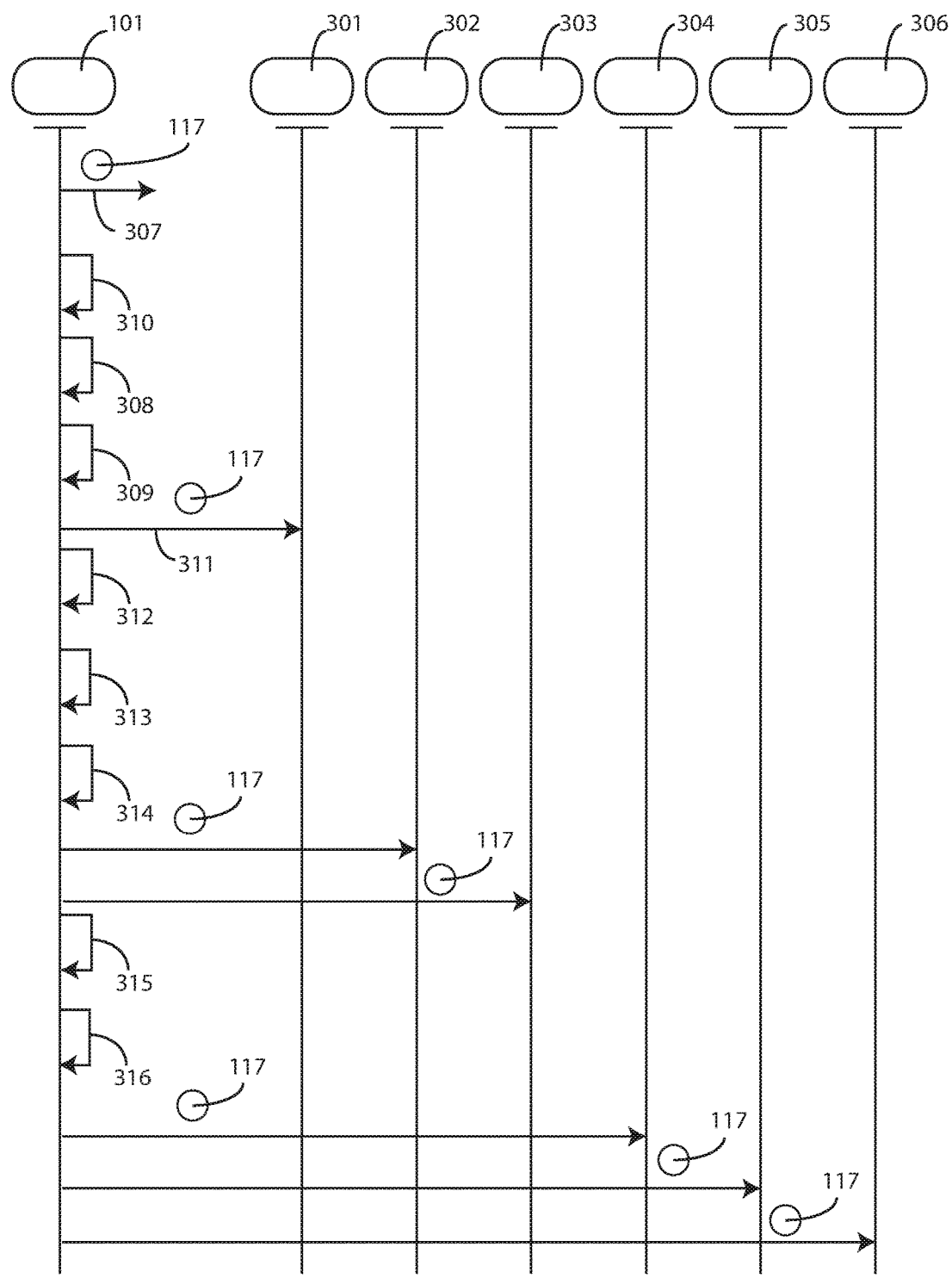
FIG. 3 illustrates one explanatory system and method in accordance with one or more embodiments of the disclosure.

Now that explanatory systems and methods have been described, a few use cases will be helpful in further appreciating the advantages and benefits offered by embodiments of the disclosure. Turning now to FIG. 3, illustrated therein is one explanatory system and method configured as a signal flow chart illustrating one or more embodiments of the disclosure.

As shown, a server structure 101 is deploying 307 an update 117 to one or more client devices. The various client devices have been divided 310 into batches 301,302,303, 304,305,306. The batches 301,302,303,304,305,306 are to receive the update 117 in succession, i.e., with batch 301 receiving the upgrade prior to batch 302, which receives the update 117 prior to batch 303, and so forth.

As noted above, in one or more embodiments, a smart scheduler engine (118) of the server structure 101 schedules 308 the deployment of updates 117. In one or more embodiments, the smart scheduler engine (118) schedules 308 the deployment of updates 117 based upon a predefined criterion or criteria. As noted above, this predefined criterion or criteria is a function of data retrieved from one or both of the monitored data database (112) and historical data database (113).

In this illustration, the data from the historical data database (113) indicates that owners of some client devices habitually turn OFF these devices when not in use. For instance, a person may turn OFF a set-top box when not watching television. Moreover, the data stored in the historical data database (113) indicates that this behavior varies by market, e.g., users in Asia have different "turn OFF" habits than those in North America, and device type, e.g., set-top boxes are turned OFF more frequently than cable modems. The data stored in the historical data database (113) further indicates that the behavior is not always consistent due to the fact that the client devices are not always turned OFF at the same time of the day or the same time of the week.

In one or more embodiments, the analytics engine (114) of the server structure 101 analyzes 309 the data stored in the historical data database (113) to determine that certain client devices are more likely to be on during an early part of the day compared to a later part of the day. Accordingly, using this information, the smart scheduler engine (118) of the server structure can group these client devices in an earlier batch, e.g., batch 301. Other devices can be grouped into a later group, e.g., group 304. This scheduling is more likely to improve overall success rates. Similarly, if the analytics engine (114) determines that the update for a particular client device is likely to fall in a window where it is likely to be turned OFF, scheduling other devices more likely to be online during earlier periods will improve overall success rates.

Accordingly, when a batch is to receive the update, in one or more embodiments the analytics engine (114) of the server structure 101 analyzes 309 the historical online status of the client devices using data stored in the historical data database (113) to identify the periods each client device is likely to be operational and networked with the server structure 101.

The smart scheduler engine (118) of the server structure 101 then divides 310 the client devices into batches 301, 302,303,304,305,306. When scheduling 308, the smart scheduler engine (118) of the server structure 101 assigns client devices that are likely to be online in earlier windows to receive the update 117 prior to those that are less likely to be online. In one or more embodiments, the smart scheduler engine (118) of the server structure 101 can further consider historical update performance rates as an additional constraint on this scheduling so that each batch comprises only the number of client devices expected to successfully complete the update in a given interval. The smart scheduler engine (118) of the server structure 101 can further consider the expected success rate and variation to intelligently oversubscribe client devices into earlier batches. Accordingly, if the update rate should perform unexpectedly quickly, or some of the client devices expected to be online turn out to be offline and fail to perform the update, the smart scheduler engine (118) of the server structure 101 can optimize the use of system resources.

A monitoring auto configuration server interface (111) of the server structure 101 then deploys 311 the update 117 to batch 301. While the update 117 is being installed on client devices of batch 301, the monitoring auto configuration server interface (111) of the server structure 101 can receive 312 statistics relating to the upgrade process and can store 313 them in the monitored data database (112). Examples of such data include whether the update 117 succeeded, failed, or requires a retry.

Once the upgrade process to batch 301 is completed, the analytics engine (114) of the server structure 101 can examine 314 the data stored in the monitored data database (112) and process it to determine statistical conclusions relating to the upgrade. These statistics can be stored in the historical data database (113). For example, the analytics engine (114) of the server structure 101 can calculate anomalies based upon the operational performance of the client devices in batch 301 before, and after, the update 117 is installed. In one or more embodiments, the analytics engine (114) of the server structure 101 can then flag certain anomalies when the amount of those anomalies rises to a predefined threshold.

If some of the client devices of batch 301 fail to successfully update due to recoverable causes, e.g., being powered OFF or being offline, or update failures exceed a predefined threshold such as five percent, e.g., due to unexpected increase in network traffic, as the update 117 is deployed to subsequent batches 302,303,304,305,306, the smart scheduler engine (118) of the server structure 101 can monitor 315 outstanding and/or unsuccessful updates from the completed batches and re-optimize 316 the schedule based on both the historical metrics of the client devices and the current campaign and client device status, e.g., the client device is failed to update because it was offline now—earlier than expected—or the campaign is performing more slowly than expected, and is likely to perform more slowly in later windows as well.

Figure 4:
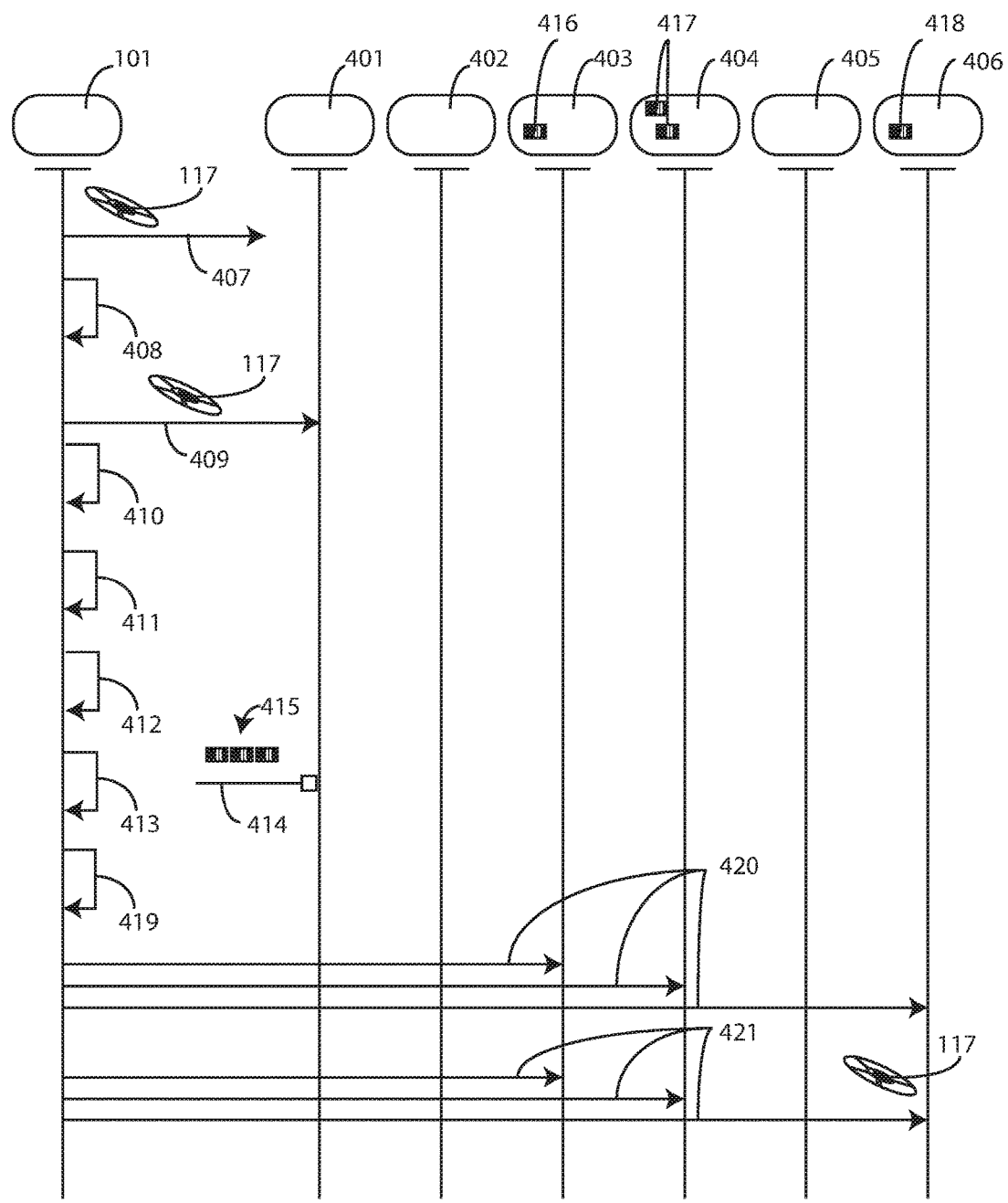
FIG. 4 illustrates another explanatory system and method in accordance with one or more embodiments of the disclosure.

Turning now to FIG. 4, illustrated therein is one explanatory system and method configured as a signal flow chart illustrating one or more embodiments of the disclosure. As shown, a server structure 101 is again deploying 407 an update 117 to one or more client devices. The various client devices have been divided into batches 401,402,403,404, 405,406. The batches 401,402,403,404,405,406 are to receive the update 117 in succession, i.e., with batch 401 receiving the upgrade prior to batch 402, which receives the update 117 prior to batch 403, and so forth, as previously described.

Embodiments of the disclosure contemplate that the owner of a client device can override the default configurations of a client device for various reasons. Illustrating by example, a particular update 117 may be incompatible (or may not take the custom configuration into consideration due to a bug) with the customer's custom configuration. This can result in a failure during deployment of the update 117 to the client device.

There are various reasons why an owner might change the default configuration. For example, the customer can turn off the "ac" standard of an 802.11 Wi-Fi standard in a router because they believe the data plan to which they subscribe offers lower speeds which are more compatible with an 802.11n standard. Regardless of reason, in one or more embodiments, a monitoring auto configuration server interface (111) of the server structure 101 forces a data sample collection just prior to deploying an upgrade. The monitoring auto configuration server interface (111) of the server structure 101 collects 408 the data just before the scheduled upgrade instead of at a regular periodic time intervals. This works to ensure that the historical data manager (116) of the server construct has the latest "before" data, which may offer additional insights along with the historical data stored in the historical data database (113).

In this illustrative embodiment, the monitoring auto configuration server interface (111) of the server structure 101 collects 408 data indicating the configuration information of a particular client device, i.e., whether the client device has a default configuration or a custom configuration.

A monitoring auto configuration server interface (111) of the server structure 101 then deploys 409 the update 117 to batch 401. While the update 117 is being installed on client devices of batch 401, the monitoring auto configuration server interface (111) of the server structure 101 can receive 410 statistics relating to the upgrade process and can store 411 them in the monitored data database (112). Examples of such data include whether the update 117 succeeded, failed, or requires a retry.

Once the upgrade process to batch 301 is completed, the analytics engine (114) of the server structure 101 can examine 412 the data stored in the monitored data database (112) and process it to determine statistical conclusions relating to the upgrade. These statistics can be stored in the historical data database (113). For example, the analytics engine (114) of the server structure 101 can calculate anomalies based upon the operational performance of the client devices in batch 401 before, and after, the update 117 is installed. In one or more embodiments, the analytics engine (114) of the server structure 101 can then flag certain anomalies when the amount of those anomalies rises to a predefined threshold.

In this illustrative embodiment, the analytics engine (114) of the server structure 101 can examine 412 the historical data stored in the historical data database (113) and use that information to assist the smart scheduler engine (118) of the server structure 101 in deciding when to schedule a software upgrade on a particular client device. The examination by the analytics engine (114) of the server structure 101 provides feedback from early batches to proactively cancel scheduled updates in later batches.

In this embodiment, when the analytics engine (114) of the server structure 101 examines 412 the status of the updates occurring in the first batch 401, it detects 413 that the software update failed 414 only for client devices 415 that have custom configuration. This feedback is used by the monitoring auto configuration server interface (111) of the server structure 101 to find 419 other devices 416,417,418 that are scheduled for updates in the later batches 403,404, 406 which have similar custom configurations. In one or more embodiments, the smart scheduler engine (118) of the server structure 101 then proactively cancels 420 the updates on those devices 416,417,418 when deploying 421 the update to their respective batches 403,404,406 as previously described, thereby limiting future failures.

Figure 5:
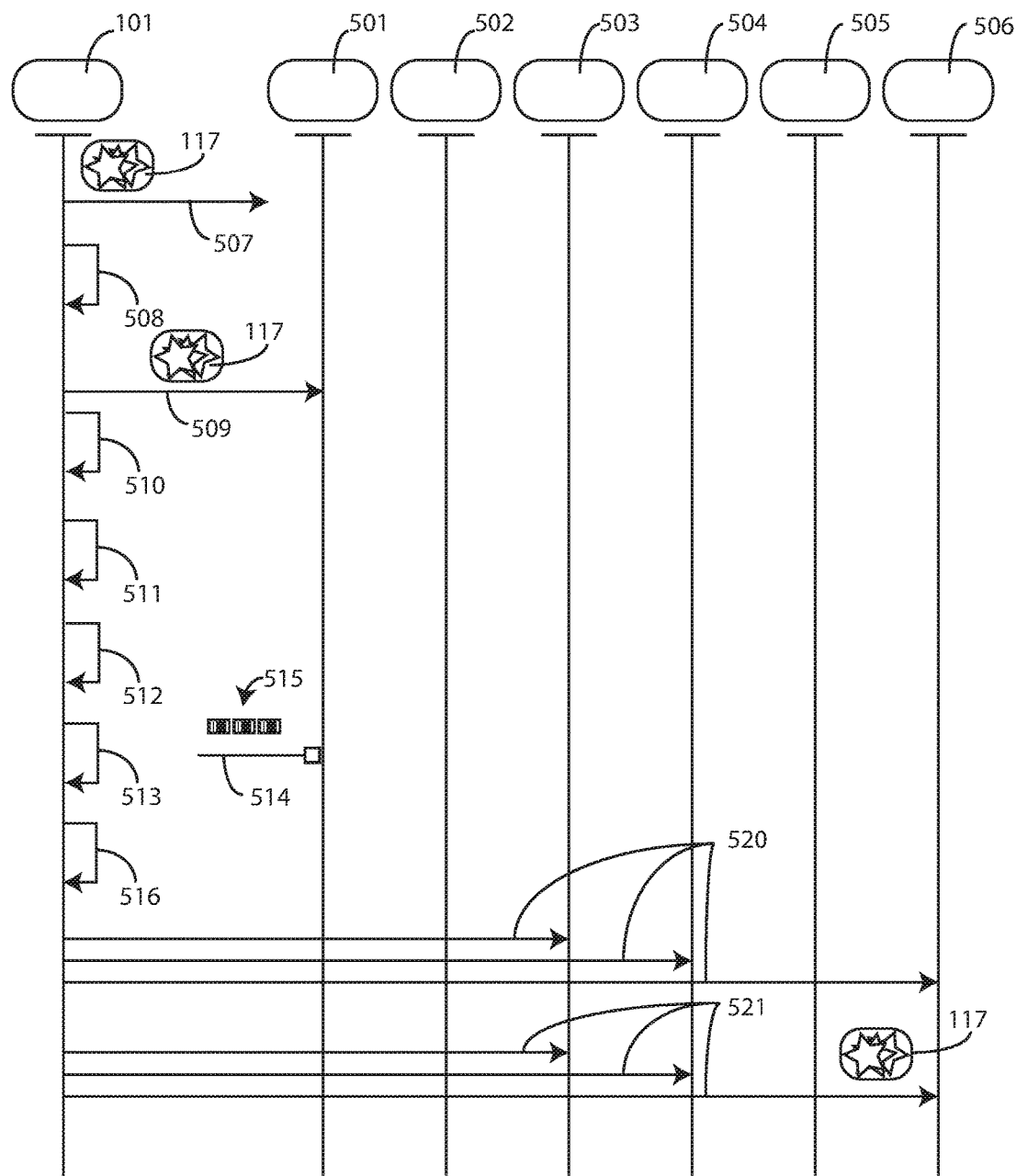
FIG. 5 illustrates yet another explanatory system and method in accordance with one or more embodiments of the disclosure.

Turning now to FIG. 5, illustrated therein is one explanatory system and method configured as a signal flow chart illustrating one or more embodiments of the disclosure. As shown, a server structure 101 is again deploying 507 an update 117 to one or more client devices. The various client devices have been divided into batches 501,502,503,504, 505,506. The batches 501,502,503,504,505,506 are to receive the update 117 in succession, i.e., with batch 501 receiving the upgrade prior to batch 502, which receives the update 117 prior to batch 503, and so forth, as previously described.

Embodiments of the disclosure contemplate that, in some cases, update failure rates are so subtle that normal diagnostic techniques, e.g., whether the client device booted normally after the update occurs, whether data transmission error rates are in the normal range after the update occurs, and so forth, are not sufficient to identify all failures. Illustrating by example, a particular client site may include three devices, e.g., a set-top box, a voice over IP device, and a home security system, that are each linked through a gateway device. After an update occurs at the gateway device, the gateway reboots. In some instances, it is possible that due to an issue with the update, one device, e.g., the set-top box, may fail to register with the gateway. Such small failure rates that may be overlooked or missed and can have a significant impact when applied to a large number of devices. To mitigate ill effects of an update applied to a large number of devices, in one or more embodiments systems and methods configured in accordance with embodiments of the disclosure employ predictive modeling based on historical success rates and historical telemetry from client devices, as stored in the historical data database (113), to monitor expected performance of client devices to be updated against actual results occurring when a particular batch is updated. If an anomalous difference is detected, embodiments of the disclosure can abort the campaign before more widespread damage is done.

In one or more embodiments, a monitoring auto configuration server interface (111) of the server structure 101 forces a data sample collection just prior to deploying an upgrade. The monitoring auto configuration server interface (111) of the server structure 101 collects 508 the data just before the scheduled upgrade instead of at a regular periodic time intervals. In this illustrative embodiment, the monitoring auto configuration server interface (111) of the server structure 101 collects 508 data indicating the number of connected devices behind each gateway device.

A monitoring auto configuration server interface (111) of the server structure 101 then deploys 509 the update 117 to batch 501. While the update 117 is being installed on client devices of batch 501, the monitoring auto configuration server interface (111) of the server structure 101 can receive 510 statistics relating to the upgrade process and can store 511 them in the monitored data database (112). Examples of such data include whether the update 117 succeeded, failed, or requires a retry.

Once the upgrade process to batch 301 is completed, the analytics engine (114) of the server structure 101 can examine 512 the data stored in the monitored data database (112) and process it to determine statistical conclusions relating to the upgrade. These statistics can be stored in the historical data database (113). For example, the analytics engine (114) of the server structure 101 can calculate anomalies based upon the operational performance of the client devices in batch 501 before, and after, the update 117 is installed. In one or more embodiments, the analytics engine (114) of the server structure 101 can then flag certain anomalies when the amount of those anomalies rises to a predefined threshold.

In this illustrative embodiment, the analytics engine (114) of the server structure 101 can examine 512 the historical data stored in the historical data database (113) and use that information to assist the smart scheduler engine (118) of the server structure 101 in deciding when to schedule a software upgrade on a particular client device. In this embodiment, when the analytics engine (114) of the server structure 101 examines 512 the status of the updates occurring in the first batch 501, it detects 513 whether the connected devices 515 register 514 with the gateway device after the update 117 occurs. If, for example, a client location had three connected client devices behind a gateway device and only two of the client devices register with the gateway device after a predefined time post update, e.g., ten minutes, the analytics engine (114) of the server structure 101 can flag this as an anomaly.

This feedback is used by the monitoring auto configuration server interface (111) of the server structure 101 to find 516 other gateway devices that are scheduled for updates in the later batches 503,504,506 which have similar custom configurations. In one or more embodiments, the smart scheduler engine (118) of the server structure 101 then proactively cancels 517 the updates on those gateway devices when deploying 518 the update to their respective batches 503,504,506 as previously described, thereby limiting future failures.

Figure 6:
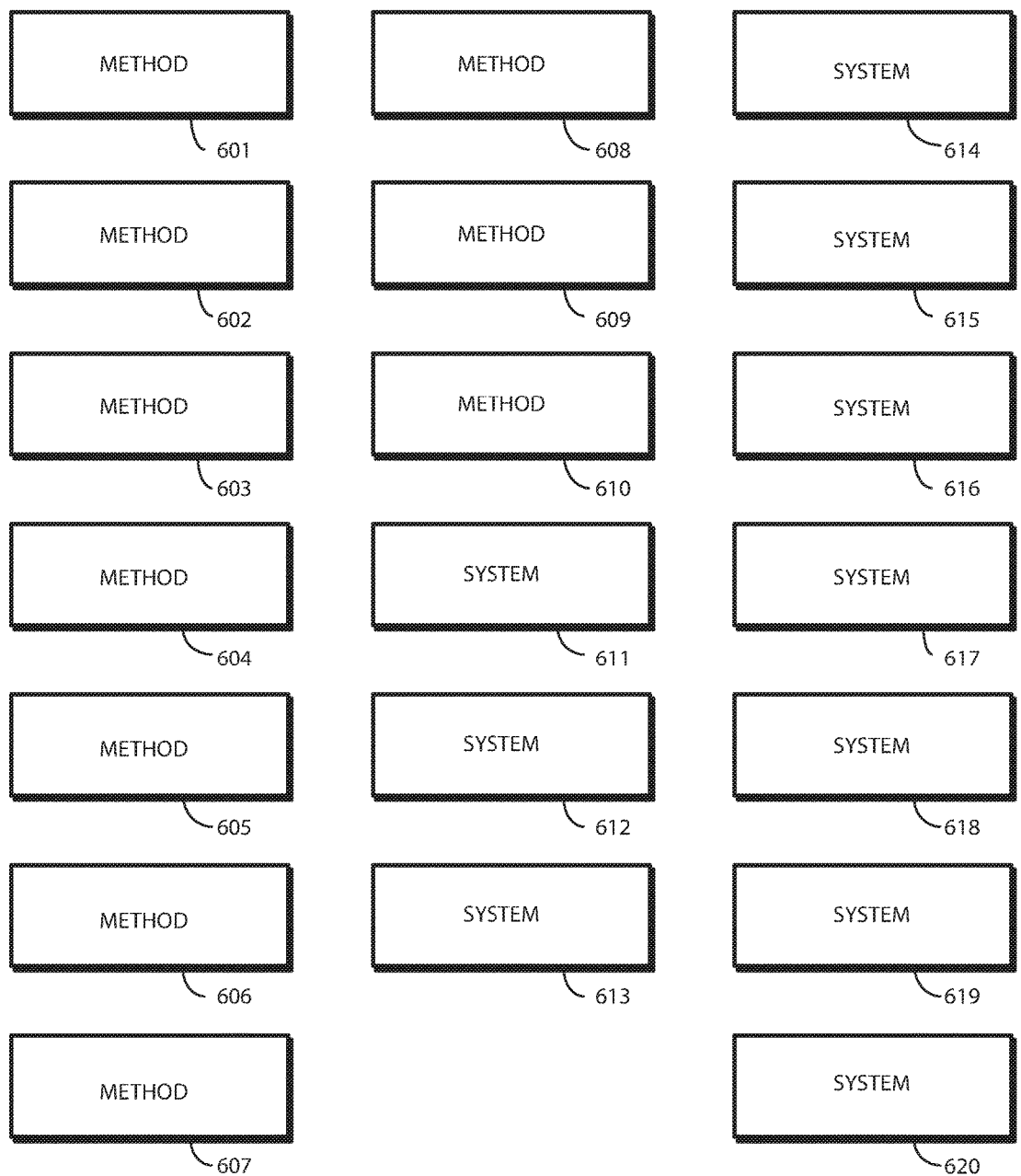
FIG. 6 illustrates various embodiments of the disclosure.

Turning now to FIG. 6, illustrated therein are various embodiments of the disclosure. At 601, a method comprises deploying, with an interface of an update server, an update to a first group of client devices. At 601, the method further comprises detecting, with an analytics engine operable with the update server, one or more anomalies occurring as a result of the update.

At 601, the method comprises investigating, with the interface of the update server, at least one additional group of client devices yet to receive the update to determine whether one or more device characteristics exist in the at least one additional group that correlate with devices of the first group experiencing the one or more anomalies. At 601, the method further comprises proactively canceling at least one future update of client devices in the at least one additional group of client devices having the one or more device characteristics.

At 602, the proactively canceling occurring at 601 occurs while delivering the update to the at least one additional group of client devices. At 603, the method of claim 601 further comprises rolling back the update of 601 in the devices of the first group experiencing the one or more anomalies.

At 604, the one or more device characteristics of 601 comprise a device type. At 605, the one or more device characteristics of 601 comprise an operating system version. At 606, the one or more device characteristics of 601 comprise a gateway device operating condition of a gateway device to which the client devices in the at least one additional group of client devices are connected.

At 607, the method of 601 further comprises scheduling rolling updates of networked client devices by selectively deploying the update to groups of the networked client devices successively. At 608, the method of 607 further comprises prioritizing the groups as a function of analyzing historical data stored in a historical data database.

At 609, the update of 601 comprises an active campaign update. At 609, the method of 601 further comprises delivering the update directly to the first group of client devices.

At 610, the update of 601 comprises a simple network management protocol update. At 610, the method of 601 further comprises setting a parameter value from a uniform resource locator in the first group of client devices. At 610, the uniform resource locator indicates from where to download the upgrade.

At 611, a system comprises an update server in communication with one or more client devices across a network. At 611, a scheduling engine of the update server schedules deployment of an update to at least a first group of client devices. At 611, a server interface of the update server deploys the update to the first group of client devices. At 611, an analytics engine, operable with the update server, identifies one or more anomalies occurring in the first group of client devices resulting from the upgrade. At 611, when the analytics engine identifying the one or more anomalies, the scheduling engine cancels future updates to at least a second group of client devices comprising devices having one or more device characteristics that correlate with other devices of the first group of client devices experiencing the one or more anomalies.

At 612, the scheduling engine of 611 schedules the deployment of the update to a plurality of client device groups on a rolling basis. At 613, the scheduling engine of 612 prioritizes the plurality of client device groups into a predefined order prior to the deployment of the update.

At 614, the system of 611 further comprises a monitored data database, which is accessible by the scheduling engine. At 614, the server interface of 611 further receives statistics relating to deployment of the upgrade and stores them in the monitored data database.

At 615, the analytics engine of 611 identifies the one or more anomalies only when the one or more anomalies exceed a predefined threshold. At 616, the server interface of 611 further searches for client device groups having the one or more characteristics in common with the other devices of the first group of client devices experiencing the one or more anomalies.

At 617, a system comprises an update server in communication with one or more client devices across a network. At 617, a scheduling engine of the update server schedules deployment of an update to at least a first group of client devices. At 617, a server interface of the update server deploys the update to the first group of client devices. At 617, an analytics engine, operable with the update server, identifies one or more anomalies occurring in the first group of client devices resulting from the upgrade. At 617, upon the analytics engine identifying the one or more anomalies, the server interface rolls back the update in devices of the first group of client devices experiencing the one or more anomalies.

At 618, the scheduling engine of 617 further cancels future updates to at least a second group of client devices comprising other devices having one or more device characteristics that correlate with the devices of the first group of client devices experiencing the one or more anomalies. At 619, the one or more anomalies of 611 comprise fewer devices operable with a gateway device registering with the gateway device after the update than before the update. At 620, the scheduling engine of 611 assigns client devices that are likely successfully receive the update in client device groups prioritized before other client device groups that are less likely to successfully receive the update.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for analytics-based updating, the method comprising:
   deploying, by an interface of an update server, an update to a first group of client devices;
   detecting, by an analytics engine operable with the update server, one or more anomalies occurring in one or more updated client devices in the first group of client devices,
      wherein the one or more anomalies occur as a result of a successful deployment of the update to the one or more updated client devices, and
      wherein the detecting comprises comparing historical data stored in a historical data database with monitored data captured from the one or more updated client devices after the successful deployment of the update to the one or more updated client devices;
   investigating, by the interface of the update server, at least one additional group of client devices yet to receive the update, the investigating comprising determining whether one or more device characteristics exist in the at least one additional group of client devices that correlate with the one or more updated client devices of the first group of client devices experiencing the one or more anomalies as the result of the successful deployment of the update to the one or more updated client devices; and based on a result of the investigating, proactively canceling at least one future update of client devices in the at least one additional group of client devices having the one or more device characteristics, to prevent an occurrence of the one or more anomalies in the at least one additional group of client devices.

2. The method of claim 1, the proactively canceling occurring while delivering the update to the at least one additional group of client devices.

3. The method of claim 1, further comprising rolling back the update in the one or more updated client devices of the first group of client devices that experienced the one or more anomalies as the result of the successful deployment of the update to the one or more updated client devices, to prevent a further occurrence of the one or more anomalies in the one or more updated client devices.

4. The method of claim 1, wherein the one or more device characteristics comprise a device type.

5. The method of claim 1, wherein the one or more device characteristics comprise an operating system version.

6. The method of claim 1, wherein the one or more device characteristics comprise a gateway device operating condition of a gateway device to which client devices in the at least one additional group of client devices are connected.

7. The method of claim 1, further comprising scheduling rolling updates of networked client devices by selectively deploying the update to groups of networked client devices successively.

8. The method of claim 7,
the detecting further comprising detecting a first anomaly of the one or more anomalies, the first anomaly comprising an operational performance difference in a first updated client device before and after the successful deployment of the update to the first updated client device, based upon the comparing wherein the historical data and the monitored data are compared for the first updated client device; and
the method further comprising prioritizing the groups as a function of analyzing the historical data stored in the historical data database.

9. The method of claim 1, wherein the update comprises an active campaign update, further comprising delivering the update directly to the first group of client devices.

10. The method of claim 1, wherein the update comprises a simple network management protocol update, further comprising setting a parameter value from a uniform resource locator in the first group of client devices, the uniform resource locator indicating from where to download the update.

11. A system for analytics-based updating, the system comprising:
an update server in communication with one or more client devices across a network;
a scheduling engine of the update server, the scheduling engine configured for scheduling deployment of an update to at least a first group of client devices;
a server interface of the update server, the server interface configured for deploying the update to the first group of client devices; and
an analytics engine, operable with the update server, the analytics engine configured for identifying one or more anomalies occurring in one or more updated client devices of the first group of client devices,
wherein the one or more updated client devices experienced the one or more anomalies as a result of a successful deployment of the update to the one or more updated client devices, and
wherein the identifying comprises comparing historical data stored in a historical data database with monitored data captured from the one or more updated client devices after the successful deployment of the update to the one or more updated client devices;
wherein the scheduling engine is further configured for canceling, based upon an identification by the analytics engine of the one or more anomalies, one or more future updates to at least a second group of client devices, to prevent an occurrence of the one or more anomalies in the at least one additional group of client devices,
wherein the second group comprises devices each having one or more device characteristics that correlate with characteristics of the one or more updated client devices of the first group of client devices, and
wherein the one or more updated client devices experienced the one or more anomalies as the result of the successful deployment of the update to the one or more updated client devices.

12. The system of claim 11, the scheduling engine further configured for scheduling deployment of the update to a plurality of client device groups on a rolling basis.

13. The system of claim 12, the scheduling engine further configured for prioritizing the plurality of client device groups into a predefined order prior to deployment of the update.

14. The system of claim 11, further comprising a monitored data database, accessible by the scheduling engine, wherein the server interface is further configured to receive statistics relating to deployment of the update and to store them in the monitored data database.

15. The system of claim 11,
wherein the identifying further comprises detecting a first anomaly of the one or more anomalies, the first anomaly comprising an operational performance difference in a first updated client device before and after the successful deployment of the update to the first updated client device, based upon the comparing wherein the historical data and the monitored data are compared for the first updated client device;
the analytics engine further configured to identify the first anomaly of the one or more anomalies only when the operational performance difference exceeds a predefined threshold.

16. The system of claim 11, wherein the server interface is further configured to search for client device groups having the one or more device characteristics in common with the one or more updated client devices of the first group of client devices that experienced the one or more anomalies as the result of the successful deployment of the update to the one or more updated client devices.

17. A system for analytics-based updating, the system comprising:
an update server in communication with one or more client devices across a network;
a scheduling engine of the update server, the scheduling engine configured for scheduling deployment of an update to at least a first group of client devices;
a server interface of the update server, the server interface configured for deploying the update to the first group of client devices; and an analytics engine, operable with the update server, the analytics engine configured for identifying one or more anomalies occurring in one or more updated client devices in the first group of client devices, the one or more anomalies resulting from a successful deployment of the update to the one or more updated client devices, wherein the identifying comprises comparing historical data stored in a historical data database with monitored data captured from the one or more updated client devices after the successful deployment of the update to the one or more updated client devices, and wherein the identifying further comprises detecting a first anomaly of the one or more anomalies, the first anomaly comprising an operational performance difference in a first updated client device before and after the successful deployment of the update to the first updated client device, based upon the comparing wherein the historical data and the monitored data are compared for the first updated client device;

wherein, upon the analytics engine identifying the one or more anomalies, the server interface rolls back the update in the one or more updated client devices of the first group of client devices that experienced the one or more anomalies as a result of the successful deployment of the update to the one or more updated client devices, to prevent a further occurrence of the one or more anomalies in the one or more updated client devices.

18. The system of claim 17, wherein the scheduling engine further cancels future updates to at least a second group of client devices comprising other devices having one or more device characteristics that correlate with the one or more updated client devices that experienced the one or more anomalies as the result of the successful deployment of the update to the one or more updated client devices, to prevent an occurrence of the one or more anomalies in the at least one additional group of client devices.

19. The system of claim 17, wherein the one or more anomalies comprise detection of fewer devices operable with a gateway device registering with the gateway device after the update than before the update.

20. The system of claim 17, wherein the scheduling engine assigns a client device that has a likelihood of successfully receiving the update to be in a client device group prioritized before other client device groups that are less likely, in comparison to the likelihood of the client device, to successfully receive the update.

\* \* \* \* \*